United States Patent Office 3,017,319
Patented Jan. 16, 1962

3,017,319
SLIMICIDE
William E. Rader, Modesto, Calif., assignor to Shell Oil Company, a corporation of Delaware
No Drawing. Filed Apr. 20, 1959, Ser. No. 807,314
4 Claims. (Cl. 162—161)

The present invention relates to an improved method for the inhibition and destruction of slime in water employed for industrial purposes and particularly for water employed in paper manufacture. More specifically, the present invention is concerned with an improved method for the destruction of slime-forming organisms in industrial waters, particularly water employed for paper manufacture, and features the employment as slimicides of esters of haloacetoacetic acid, such as methyl alpha-chloroacetoacetate and ethyl alpha-chloroacetoacetate.

Slime-forming organisms are contained in virtually all industrial waters employed in pulp and paper manufacture and are known to cause the gelatinous formation known as paper slime. Paper slime constitutes one of the most serious problems in the papermaking industry because it causes spots, pinholes and breaks in the paper and often influences poor formation of the sheet. Slime also collects about screens, wires and other equipment, thus making necessary frequent cleaning periods with resultant loss in production. With the increased use of white water, i.e., water which has previously been used in the papermaking process, the importance of an economical yet efficient slimicide has become increasingly manifest.

It is consequently the principal object of the present invention to provide a new and novel method for the inhibition or destruction of slime in industrial waters and particularly in water employed in paper making which is economical and efficient. It is another object of the present invention to provide a new and novel method for the destruction or inhibition of slime-forming microorganisms in paper manufacturing water which overcomes the shortcomings of processes heretofore used for this purpose, particularly the formation of undesirable chemical residue on the paper.

Other objects, features and advantages of the present invention will be apparent from the following description read in conjunction with the appended claims.

Pulp is a commercial cellulosic material prepared from wood, rags and other sources which are used in the manufacture of paper. Pulp may be prepared from wood by either mechanical or chemical processes both of which are utilizable for the purposes of the present invention. In the mechanical process, the wood is shredded to form a ground wood or pulp. In the chemical process, on the other hand, the cellulose and the wood are freed from the lignin content and other non-cellulosic substances present therein by treatment with reagents which form soluble reaction products with the non-cellulosic materials. The residual cellulose so treated is subsequently washed and bleached. The chief methods of chemical pulping are the sulfite process and the sulfate or kraft process. In essence, the sulfite process comprises heating the wood under pressure with a solution of calcium bisulfite containing excess sulfur dioxide. In the sulfate process an alkaline solution containing sodium sulfide is employed. The present invention also contemplates the employment of pulp prepared by a semi-chemical process such as, for example, chemically softening the wood to permit mechanical separation of the fiber.

The pulps employed for the purposes of the present invention may vary considerably without departing from the scope of the invention. Thus, the pulp employed may, if desired, be additionally treated by bleaching. Pulps which may be employed for the purposes of the present invention include unbleached ground wood, unbleached sulfite, bleached sulfite, semi-bleached sulfate and bleached sulfate or bleached kraft. All of these raw materials are satisfactory, it being understood, however, that the present invention is not restricted to the enumerated pulps.

In the papermaking process the pulps are prepared as water slurries. In this form they are conveyed, measured and subjected to the desired mechanical treatments before being processed through the paper machine. Such mechanical treatment of the fibers has been found necessary for those grades of paper most commonly used because it expedites the establishment of the system's behavior during the actual sheet-forming and drying procedures. This treatment of the pulp, which precedes the passing of the raw material into the papermaking machine itself, includes slushing, beating, refining, filling, loading, sizing and coloring, all in accordance with methods well known to those well versed in the art. Slushing generally denotes that the dry sheets of pulp are fiberized or otherwise disintegrated in water to form a slush of separated fibers. This operation is conducted merely to disperse the fibers in water. Beating and refining refer to the operations carried out and the effects produced by conventionally employed beating and refining equipment such as the Hollander beater. Beating increases fiber surface and flexibility and tends to decrease fiber length. The cellulosic and hemicellulosic constituents of the fiber tend to swell upon heating and the amount of water bound in the fiber increases with an associated decrease in pulp freeness.

Many types of paper contain fillers such as clay, chalk or other metallic oxides or salts which are added to slurries during stock preparations to effect specific properties. Rosin, various hydrocarbons and natural hydrocarbons and natural waxes, glues, synthetic resins, rubber latex, and the like are among the materials employed as sizing agents. Paper is generally sized to cause resistance to penetration by liquids, particularly water. The sizing agents are quite often added to the stock before it is passed to the papermaking machine. It is, of course, also possible to pass the sheets through a size solution or over a roll wetted with the size solution. When desired, coloring matter may also be added to the pulp in accordance with any of the methods known to the art, such as dip dyeing or calender staining of board.

The conversion of the fibrous suspension of pulp prepared by the above method into paper sheet involves three major steps: (1) the random arrangement of the fibers of the suspension into a wet web; (2) the removal of a portion of the free water from the wet web by weighting or pressing; and (3) progressive removal of water by heating. Broadly considered, a wet sheet is generally formed by running a dilute suspension of fibers evenly over the surface of a moving endless belt of wire cloth through which the excess water may be drained or by running an endless belt of wire cloth through a suspension of fibers. In the first case, commonly called the Fourdrinier process, a portion of the water drains off by gravity, a second portion is taken from the sheet by suction, and the remainder is removed by pressure. In the latter method a vacuum is maintained below the cylinder in which the wire cloth is rotating and the sheet forms on the wire by suction. It has been estimated that the stock progressing on the wire contains 99–99.5% or more water, and the wet sheet coming off at the couch roll may contain 78–82% water. Many factors, of course, affect the rate of draining, including, for example, wire size, stock temperature, the presence of deflocculating chemicals and fiber condition in terms of hydration, fiber tension and fibrillation. The water leaving the wire of the Fourdrinier machine or cylinder of a cylinder machine is known as white water. White water contains a measurable amount of fibers lost mainly through the wire mesh where the sheet is first formed, together with water solubles, such as starch, rosin, alum, dyestuffs, etc. The composition of white water will, of course, vary with each mill operation. White water is reused until the soluble constituents increase to the point where its continued employment is either uneconomical or undesirable.

One most important problem involved in the use of white water is the presence of slime-forming microorganisms. It has now been discovered that the addition of esters of alpha-haloacetoacetic acid, particularly methyl alpha-chloroacetoacetate and ethyl alpha-chloroacetoacetate, to the water which is to be used in the papermaking process or to the white water which has already been used in the paper manufacturing process substantially diminishes and, in some cases, altogether destroys noxious slime-forming microorganisms. This discovery is particularly important because of the increasing employment of closed systems employing white water. Through the employment of these esters, maximum utility of this industrial water is effected at considerable saving of time and money. The esters particularly contemplated by the present invention may be represented by the following structural formula:

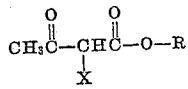

wherein R represents a hydrocarbyl, a substituted hydrocarbyl (preferably substituted with a halogen atom or $NO_2$ group) or a functional group containing oxygen. More specifically, R may represent an alkyl group, a substituted alkyl group, a cycloalkyl group or a substituted cycloalkyl group. When R is a straight chain or cycloalkyl group, it preferably contains 1–20 carbon atoms. R may also represent an aryl group, an aralkyl group such naphthyl, a substituted aryl group, an aralkyl group such as benzyl, or a substituted aralkyl group such as pentachlorobenzyl. R may also represent a functional group containing oxygen such as R′OR″ and

wherein R′ and R″ individually represent the groups represented by R. X represents a halogen atom, preferably chlorine.

Compounds particularly contemplated by the present invention are: methyl 2-chloroacetoacetate, ethyl 2-chloroacetoacetate, dodecyl 2-chloroacetoacetate, 2-chloroethyl 2-chloroacetoacetate, hexadecyl 2-chloroacetoacetate, cyclohexyl 2-chloroacetoacetate, benzyl 2-chloroacetoacetate, cyclohexylmethyl 2-chloroacetoacetate, p-chlorobenzyl 2-chloroacetoacetate, p-nitrobenzyl 2-chloroacetoacetate, 2-methoxyethyl 2-chloroacetoacetate, 2-acetoxyethyl 2-chloroacetoacetate, 2-(benzoyloxy) ethyl 2-chloroacetoacetate, 2,3,4,5,6-pentachlorobenzyl 2-chloroacetoacetate, eicosanyl 2-bromoacetoacetate, 2-fluorocyclopentyl 2-fluoroacetoacetate, p-iodophenyl 2-iodoacetoacetate and naphthyl 2-chloroacetoacetate.

The haloacetoacetate esters of the present invention may be made by any of the methods commonly employed in the art. Thus, the chlorination of the appropriate acetoacetate ester yields the corresponding slimicide such as methyl 2-chloroacetoacetate. The fluoro and iodo compounds may also be synthesized employing known methods.

The quantity of ester employed for the purposes of the present invention may vary considerably. It has been found, for example, that methyl and ethyl 2-chloroacetoacetate evidence observable effects at a concentration of 5 parts per million in water. A range of at least 5 parts per million to 25 parts per million is considered desirable for these compounds. A range of 10 parts per million to 20 parts per million is preferred for methyl and ethyl 2-chloroacetoacetate. The concentrations of the broad class of compounds contemplated for the purposes of the present invention may vary very considerably. Generally, a concentration in excess of 5 parts per million should be employed. A range of 5 p.p.m. to 100 p.p.m. is practicable for the purposes of the present invention. The compounds may be added continuously to the water or, if desired, batchwise. It is possible to add the compound to the water before the papermaking operation is initiated or during the paper processing or, if desired, to spent white water which is considered unusable because of its slime content after the papermaking process. The esters employed for the purposes of the present invention are particularly advantageous because they do not leave residue on the paper sheets, whereas chemicals which have heretofore been used in the papermaking process as slimicides often leave such an undesirable residue. The extraordinary effectiveness of the compounds of the present invention is amply illustrated by an experiment wherein white water obtained from an operating paper mill is seeded with bacterial slime from a contaminated mill. Chemicals were added and incubated at 37° C. for five days. Upon the addition of methyl 2-chloroacetoacetate in a concentration of 10 parts per million, slime formation was significantly diminished. Addition of methyl 2-chloroacetoacetate in a concentration of 50 parts per million destroyed slime-forming microorganisms. Similar results were found when employing ethyl 2-chloroacetoacetate.

In another series of tests white water from a paper mill was treated with various concentrations of test chemicals in 125-ml. Erlenmeyer flasks. After twenty-four hours incubation at room temperature, the treated white water was examined for numbers of viable bacterial colonies. Results of these tests are summarized in the following table:

| Compound | Numbers of Bacterial Colonies at Dosages of— | | | | | |
|---|---|---|---|---|---|---|
| | 1 p.p.m. | 5 p.p.m. | 10 p.p.m. | 25 p.p.m. | 50 p.p.m. | 100 p.p.m. |
| Methyl 2-chloro-acetoacetate | $200 \times 10^5$ | $150 \times 10^5$ | $5 \times 10^3$ | 0 | 0 | 0 |
| Cyclohexyl 2-chloroacetoacetate | $200 \times 10^5$ | $150 \times 10^5$ | $60 \times 10^3$ | 10 | 0 | 0 |
| 2-Chloroethyl 2-chloroacetoacetate | $150 \times 10^5$ | $100 \times 10^4$ | $100 \times 10^3$ | 0 | 0 | 0 |
| Ethyl 2-chloroacetoacetate | $100 \times 10^5$ | $200 \times 10^5$ | $80 \times 10^3$ | $100 \times 10^2$ | 0 | 0 |

Since slime formed in pulp and papermaking machines is due to for the most part to the activity of a wide range of microorganisms such as aerobic bacteria of the Aerobacter and Bacillus genera, in-vitro tests were conducted which show the extraordinary activity of the esters of the present invention to a wide spectrum of microorganisms.

Results of these tests are summarized in the following table:

| Organism | Concentration of Methyl 2-Chloroacetoacetate Required for Total Kill (mg. per ml. of media) |
|---|---|
| Pseudomonas putrefaciens | 20 |
| Pseudomonas aeruginosa | 10 |
| Saccharomyces cerevisiae | 5 |
| Chaetomium globosum | 10 |
| Penicillium italicum | 10 |
| Rhizoctonia solani | 10 |
| Helminthosporium turcicum | 5 |
| Botrytis allii | 5 |
| Polyporus tulipifera | 5 |
| Streptomyces scabies | 20 |

Additionally, it has been found that methyl 2-chloroacetoacetate controls the anerobic *Desulfovibrio desulfuricans* at a concentration of 5 to 10 p.p.m.

In another series of tests the concentration of compounds employed for the purposes of the present invention required to kill *Aerobacter aerogenes* and *Bacillus subtilis* was determined. The results of these tests are summarized in the following table:

| Compound | End point in p.p.m. for— | |
|---|---|---|
| | Aerobacter aerogenes | Bacillus subtilis |
| Dodecyl 2-chloroacetoacetate | 100 | 100 |
| 2-Chloroethyl 2-chloroacetoacetate | 60 | 50 |
| Cyclohexyl 2-chloroacetoacetate | 60 | 50 |
| Benzyl 2-chloroacetoacetate | 20 | 15 |
| Cyclohexylmethyl 2-chloroacetoacetate | 20 | 15 |
| p-Chlorobenzyl 2-chloroacetoacetate | 40 | 30 |
| 2-Methoxyethyl 2-chloroacetoacetate | 60 | 50 |
| 2-(Benzoyloxy)ethyl 2-chloroacetoacetate | 30 | 30 |

The active compounds of the present invention may be used alone or in the form of a solution, preferably a water solution, suitable emulsion or suspension and, if desired, in combination with other slimicide agents. It is also possible to employ the compounds of the present invention with chemicals which act to alter or modify the tensile strength, particularly the wet strength absorbency, color, texture, grease resistance, loss and printability of the final product. Hence, compounds of the present invention may be combined with certain non-reactive plastic material to improve wet strength. Other combinations of chemicals with slimicides of the present invention will be apparent to those well versed in the art, it being understood that the enumerated combinations of the present slimicides with chemicals employed in pulp and paper manufacture are not restricted to the specified functions of these chemicals or to the chemicals specifically enumerated.

It will be understood that though particular emphasis has been placed on the employment of the esters of the present invention in combating slime in pulp and paper manufacturing water the aforementioned esters of alpha-haloacetoacetic acid may be employed with good results in combating slime in other industrial waters such as, for example, those used in the textile industry.

I claim as my invention:
1. The method of combating slime in industrial waters comprising the step of adding a biocidal effective amount of an ester of a haloacetoacetic acid to said water.
2. In the preparation of paper, the improvement comprising adding an ester of a haloacetoacetic acid to water employed in said preparation in a quantity sufficient to kill microorganisms contained therein.
3. In the preparation of paper, the improvement comprising adding methyl alpha-chloroacetoacetate to water employed in said preparation in a concentration ranging between 5 and 25 parts per million of said ester to water.
4. In the preparation of paper, the improvement comprising adding ethyl alpha-chloroacetoacetate to water employed in said preparation in a concentration ranging between 5 and 25 parts per million of said ester to water.

References Cited in the file of this patent
UNITED STATES PATENTS

| 2,819,293 | Stelt | Jan. 7, 1958 |
| 2,824,888 | Raasch | Feb. 25, 1958 |
| 2,901,394 | Rosher | Aug. 25, 1959 |

OTHER REFERENCES

Chem. Abstracts, vol. 43, October-November 1949, page 9334(g).